(12) United States Patent
Suzuki (10) Patent No.: US 6,414,840 B2
(45) Date of Patent: *Jul. 2, 2002

(54) ELECTRONIC APPLIANCE HAVING OPEN/CLOSE-TYPE PANEL AND METHOD FOR REDUCING ELECTROMAGNETIC NOISE FROM OPEN/CLOSE-TYPE PANEL

(75) Inventor: Hiroo Suzuki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,943

(22) Filed: Jan. 6, 1999

(30) Foreign Application Priority Data

Jan. 9, 1998 (JP) .......................................... 10-003200

(51) Int. Cl.$^7$ ................................................. G06F 1/16
(52) U.S. Cl. ....................... 361/681; 361/679; 361/681; 361/683
(58) Field of Search ................................ 361/679, 680, 361/681, 683

(56) References Cited

U.S. PATENT DOCUMENTS

| 5,001,659 A | | 3/1991 | Watabe | |
|---|---|---|---|---|
| 5,138,565 A | * | 8/1992 | Satou | ........................ 364/708 |
| 5,596,173 A | | 1/1997 | Yi | |

* cited by examiner

Primary Examiner—Darren Schuberg
Assistant Examiner—Yean-Hsi Chang
(74) Attorney, Agent, or Firm—Frommer Lawrence & Haug LLP; William S. Frommer; Matthew K. Ryan

(57) ABSTRACT

The present invention provides an apparatus and a method for reducing an electromagnetic noise radiated from an open/close-type panel of an electronic apparatus having the open/close-type panel such as a laptop type personal computer and a portable video tape recorder, which comes in contact with an appliance main body so as to be latched therewith when the open/close-type panel is opened. A conductive material which conducts a conductive surface for preventing an undesired radiation of the open/close-type panel is provided on a portion of the open/close-type panel which comes in contact with the appliance main body, and a conductive material having elasticity which conducts a zero electric potential portion (earth line) of the appliance main body is provided in a portion of the surface of the appliance main body which comes in contact with the open/close-type panel, and when the open/close-type panel is opened so as to be latched with the appliance main body, the conductive material of the open/close-type panel and the conductive material of the appliance main body are connected with each other face to face by an elastic deformation of the conductive material of the appliance main body, and the conductive surface for preventing an undesired radiation of the open/close-type panel is connected with the zero electric potential portion of the appliance main body at a low impedance so that an electromagnetic noise radiated from the open/close-type panel is reduced.

15 Claims, 9 Drawing Sheets

ELECTRONIC APPLIANCE HAVING OPEN/CLOSE-TYPE PANEL AND METHOD FOR REDUCING ELECTROMAGNETIC NOISE FROM OPEN/CLOSE-TYPE PANEL

BACKGROUND OF THE INVENTION

1. Field of the Invention

The present invention relates to an electronic appliance having an open/close-type panel such as a laptop type personal computer, a portable video tape recorder or the like, and relates to a method to reduce an electromagnetic noise from the open/close-type panel of an electronic appliance having an open/close-type panel.

2. Description of the Related Art

In recent years, in electronic appliances such as a portable video tape recorder (portable VTR), a laptop type personal computer and the like, appliances having an open/close-type panel have been proposed.

Figure 12:
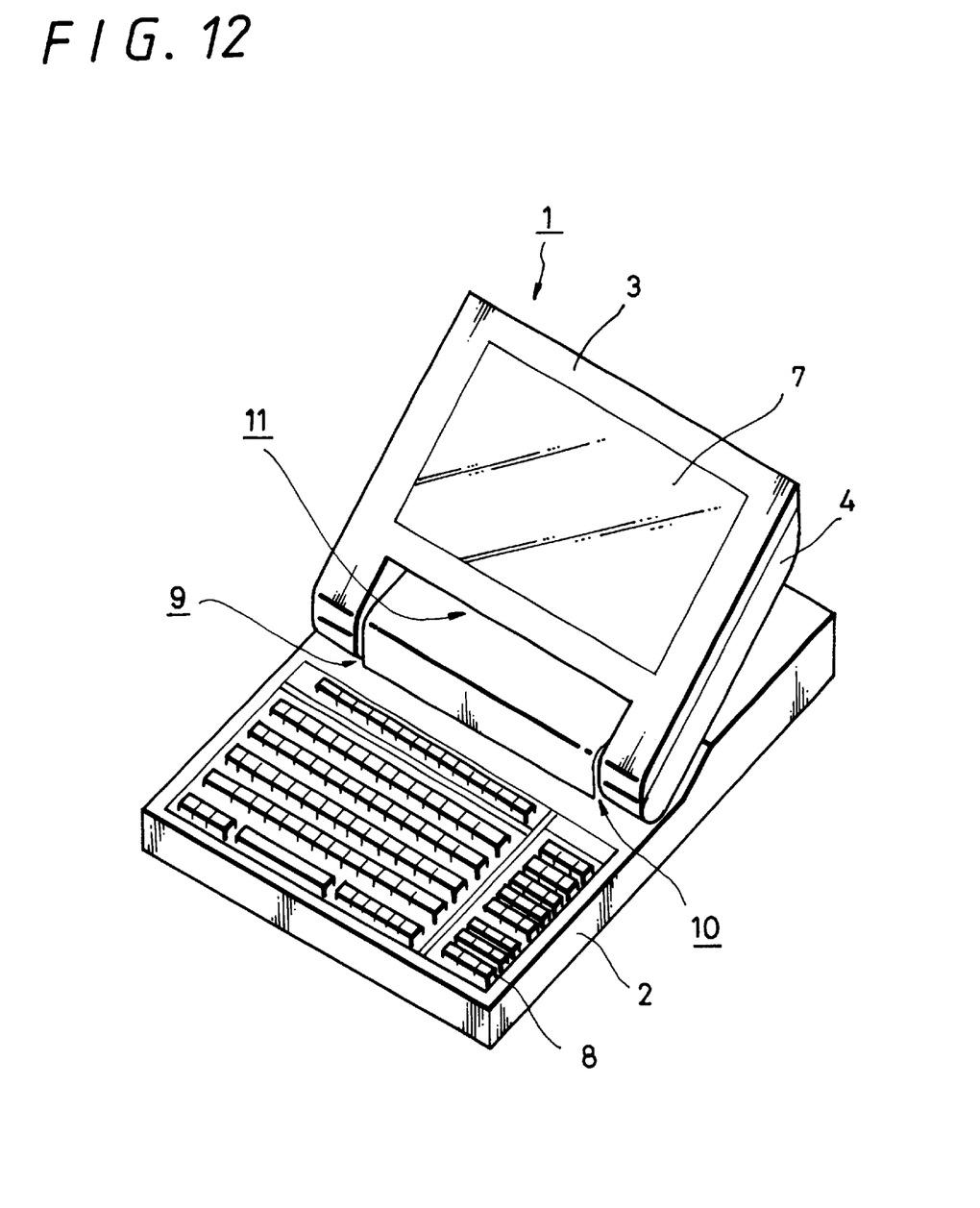
FIG. 12 is a diagram showing a laptop type personal computer as an example of a conventional electronic appliance having an open/close-type panel.

FIG. 12 shows a schematic structure of a laptop-type personal computer as one example of an electronic appliance having such the open/close-type panel.

This personal computer is composed of an open/close-type panel 1 and a main body 2 if it is roughly classified. Here, on the main body 2 side is provided with an operating portion 8 in which a key board or the like is disposed.

Meanwhile, the open/close-type panel 1 is composed of a liquid crystal display (LCD), and an upper panel 3 and a lower panel 4 which cover the liquid crystal display (LCD). Also, on the upper panel 3 side is provided a display unit 7 made of the liquid crystal display (LCD).

Here, attention has lately been focused on undesired radiation emanating from the open/close-type panel, that is, a problem about an electromagnetic noise which is generated in the open/close-type panel and is radiated outward therefrom.

For example, as an example of the undesired radiation, when a personal computer is operated in an airplane, there is a case of malfunctioning of electronic appliances in the airplane.

In this way, from a standpoint of the controversial undesired radiation, a widely known effective countermeasure is to electrically connect the open/close-type panel and the main body by a lower impedance to let them-have a same electric potential.

Therefore, in the personal computer of FIG. 12, electrically connecting the open/close-type panel 1 with the main body 2 by a lower impedance can be said to be advantageous.

To this end, the open/close-type panel 1 and the main body 2 are electrically connected through rotary portions 9 and 10.

However, in the above-mentioned conventional personal computer having an open/close-type panel, only a thin wire can be threaded through the rotary portions 9 and 10.

Also, because the length of the wire itself cannot be shortened, the impedance thereof tends to rise higher, thereby easily giving rise to an occurrence of potential difference between the open/close-type panel 1 side and ground.

Therefore, a conventional structure has a defect that a minute electromagnetic noise which occurs in the open/close-type panel 1 becomes a large noise and is radiated outside due to this potential difference.

SUMMARY OF THE INVENTION

The present invention has been achieved in view of such problems and its object is to provide an electronic appliance having an open/close-type panel capable of reducing an electromagnetic noise which is radiated outside from the open/close-type panel of the electronic appliance and a method for reducing the electromagnetic noise from the open/close-type panel of the electromagnetic appliance having an open/close-type panel.

Further, another object of the present invention is to provide an electronic appliance having an open/close-type panel which can reduce an impedance of connection between the open/close-type panel and a main body by enlarging a contact area between a conductive material provided in the main body and a conductive material provided in the open/close-type panel so as to be capable of reducing the electromagnetic noise from the open/close-type panel, and to provide a method for reducing the electromagnetic noise from the open/close-type panel.

The present invention provides an electronic appliance, where an open/close-type panel is opened and it is brought into contact (bumps against) an appliance main body so as to be latched therewith. In such an electronic appliance, a conductive material which conducts a conductive surface for preventing an undesired radiation of the open/close-type panel is provided in a portion of a surface of the open/close-type panel in contact with the appliance main body, and a conductive material having elasticity which conducts a zero electric potential portion (earth line) of the appliance main body is provided in a portion of a surface of the appliance main body in contact with the open/close-type panel, and when the open/close-type panel is opened so as to be latched with the appliance main body, the conductive material of the open/close-type panel and the conductive material of the appliance main body are electrically connected with each other face to face by an elastic deformation of the conductive material of the appliance main body.

In addition, the present invention provides an electronic appliance where an open/close-type panel is opened and it is brought into contact with an appliance main body so as to be latched therewith. In such an electronic appliance, a conductive tape as a conductive material which conducts a conductive surface for preventing an undesired radiation of the open/close-type panel is provided in a portion of a surface of the open/close-type panel in contact with the appliance main body, and a conductive material having elasticity which conducts a zero electric potential portion of the appliance main body is provided in a portion of a surface of the appliance main body in contact with the open/close-type panel.

In addition, the present invention provides an electronic appliance where an open/close-type panel is opened and it is brought into contact with an appliance main body so as to be latched therewith. In such an electronic appliance, a metal plate as a conductive material which conducts a conductive surface for preventing an undesired radiation of the open/close-type panel is provided in a portion of a surface of the open/close-type panel in contact with the appliance main body, and a conductive material having elasticity which conducts a zero electric potential portion of the appliance main body is provided in a portion of a surface of the appliance main body in contact with the open/close-type panel.

In addition, the present invention provides an electronic appliance where an open/close-type panel is opened and it is brought into contact with an appliance main body so as to be latched therewith. In such an electronic appliance, a metal plate as a conductive material which conducts a conductive surface for preventing an undesired radiation of the open/ close-type panel is provided in a portion of a surface of the open/close-type panel in contact with the appliance main body by screwing it, and a conductive material having elasticity which conducts a zero electric potential portion of the appliance main body is provided in a portion of a surface of the appliance main body in contact with the open/close-type panel.

In addition, the present invention provides an electronic appliance where an open/close-type panel is opened and it is brought into contact with an appliance main body so as to be latched therewith. In such an electronic appliance, plural apertures are provided in a portion of a surface of the open/close-type panel in contact with the appliance main body, and a metal plate as a conductive material which conducts a conductive surface for preventing an undesired radiation of the open/close-type panel by bonding the metal plate thereon using a conductive adhesive through the apertures, and a conductive material having elasticity which conducts a zero electric potential portion of the appliance main body is provided in a portion of a surface of the appliance main body in contact with the open/close-type panel.

Further, the present invention provides an electronic appliance where an open/close-type panel is opened and it is brought into contact with an appliance main body so as to be latched therewith. In such an electronic appliance, a conductive material which conducts a conductive surface for preventing an undesired radiation of the open/close-type panel is provided in a portion of a surface of the open/close-type panel in contact with the appliance main body, and a conductive material having elasticity which conducts a zero electric potential portion of the appliance main body is bonded on a metal material exposed portion of a surface of the appliance main body made of a metal material which is in contact with the open/close-type panel through a conductive adhesive.

In addition, the present invention provides an electronic appliance where an open/close-type panel is opened and it is brought into contact with an appliance main body so as to be latched therewith. In such an electronic appliance, a conductive material which conducts a conductive surface for preventing an undesired radiation of the open/close-type panel is provided in a portion of a surface of the open/close-type panel in contact with the appliance main body, and a conductive material having elasticity which conducts a zero electric potential portion of the appliance main body in plural positions of a metal material exposed portion of a surface of the appliance main body made of a metal material which is in contact with the open/close-type panel through a non-conductive adhesive.

Further, the present invention provides an electronic appliance where an open/close-type panel is opened and it is brought into contact with an appliance main body so as to be latched therewith. In such an electronic appliance, a conductive material which conducts a conductive surface for preventing an undesired radiation of the open/close-type panel is provided in a portion of a surface of the open/close-type panel in contact with the appliance main body, and plural apertures are provided in a portion of a surface of the appliance main body made of a synthetic resin material in contact with the open/close-type panel, and a conductive material having elasticity which conducts a zero electric potential portion of the appliance main body is bonded by using a conductive adhesive through the apertures.

Further, the present invention provides a method of reducing an electromagnetic noise from an open/close-type panel of an electronic appliance where the open/close-type panel is opened and it is brought into contact with an appliance main body so as to be latched therewith. In such a method, when the open/close-type panel is opened until it comes in contact with the appliance main body, a conductive material, which conducts a conductive surface for preventing an undesired radiation of the open/close-type panel and is provided in a portion of a surface of the open/close-type panel in contact with the appliance main body, and a conductive material having elasticity, which conducts a zero electric potential portion of the appliance main body and is provided in a portion of a surface of the appliance main body in contact with the open/close-type panel, are brought into contact with each other face to face by an elastic deformation of the conductive material of the appliance main body so that the conductive material of the open/close-type panel and the conductive material of the appliance main body are electrically connected with each other face to face.

Still another objects, features and advantages of the present invention should be more readily apparent from the following description with reference to accompanying drawings.

DETAILED DESCRIPTION OF THE PREFERRED EMBODIMENT

Hereafter, an embodiment of the present invention will be explained with reference to FIGS. 1 through 11.

Figure 1:
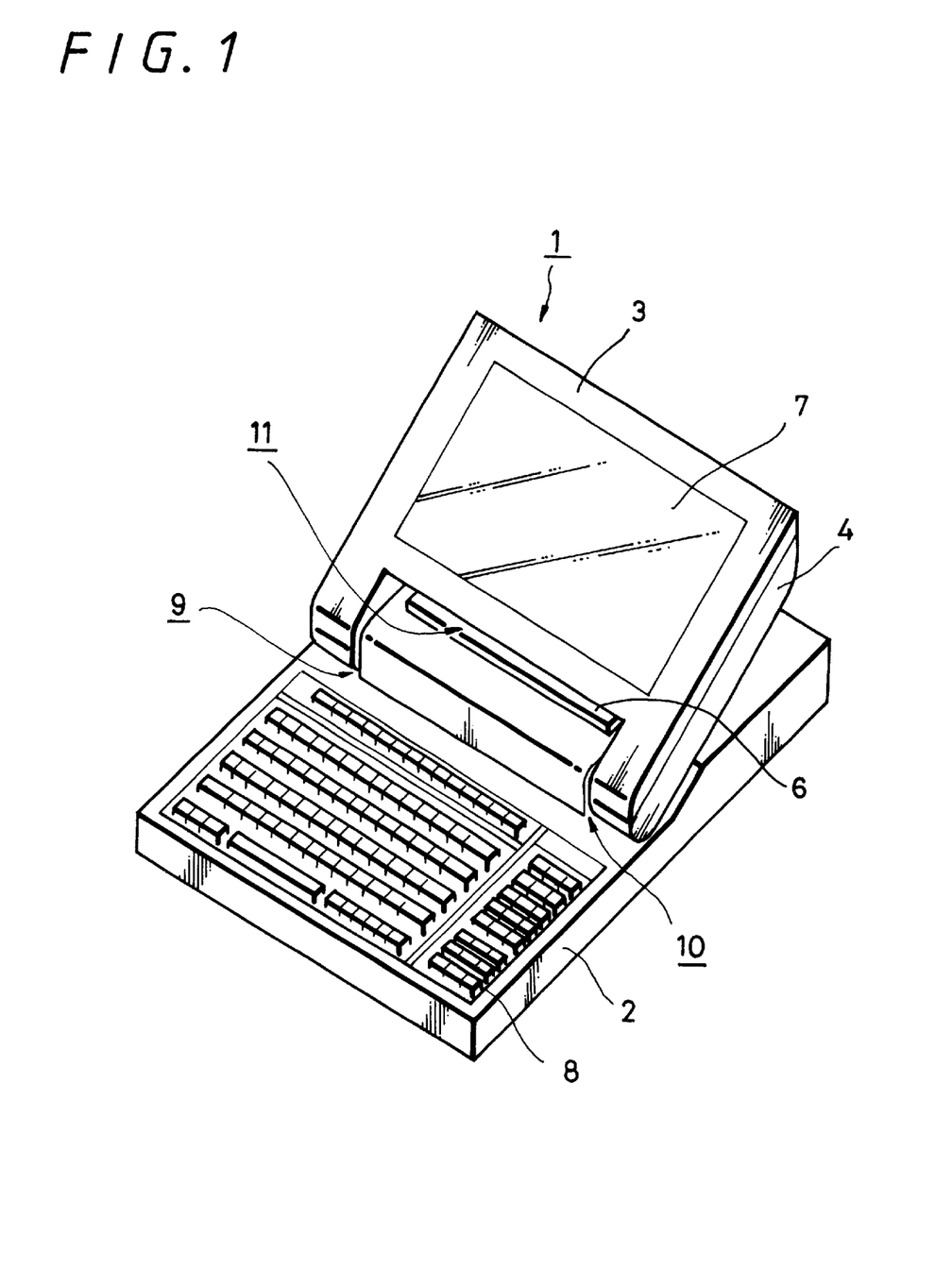
FIG. 1 is a perspective view showing the relation between an open/close-type panel and a main body of a laptop type personal computer as an example of an electronic appliance having the open/close-type panel according to the present invention.

FIG. 1 is a schematic view of a laptop type personal computer having an open/close-type panel as one example to which the present invention is applied.

Meanwhile, an explanation about the arrangement explained in the prior art will be omitted while the same reference numerals are used.

Here, an open/close-type panel 1 is arranged so that a lower side of its rear surface portion comes in contact with a main body 2 so as to be latched therewith while being in use. That is, a conductive material provided on a lower panel 4 of the open/close-type panel 1 comes in contact with a conductive material (cushion 6) provided on the main body 2 in a contact portion 11 positioned between rotary portions 9 and 10, and the open/close-type panel 1 is supported on an incline with respect to the main body 2

Figure 2:
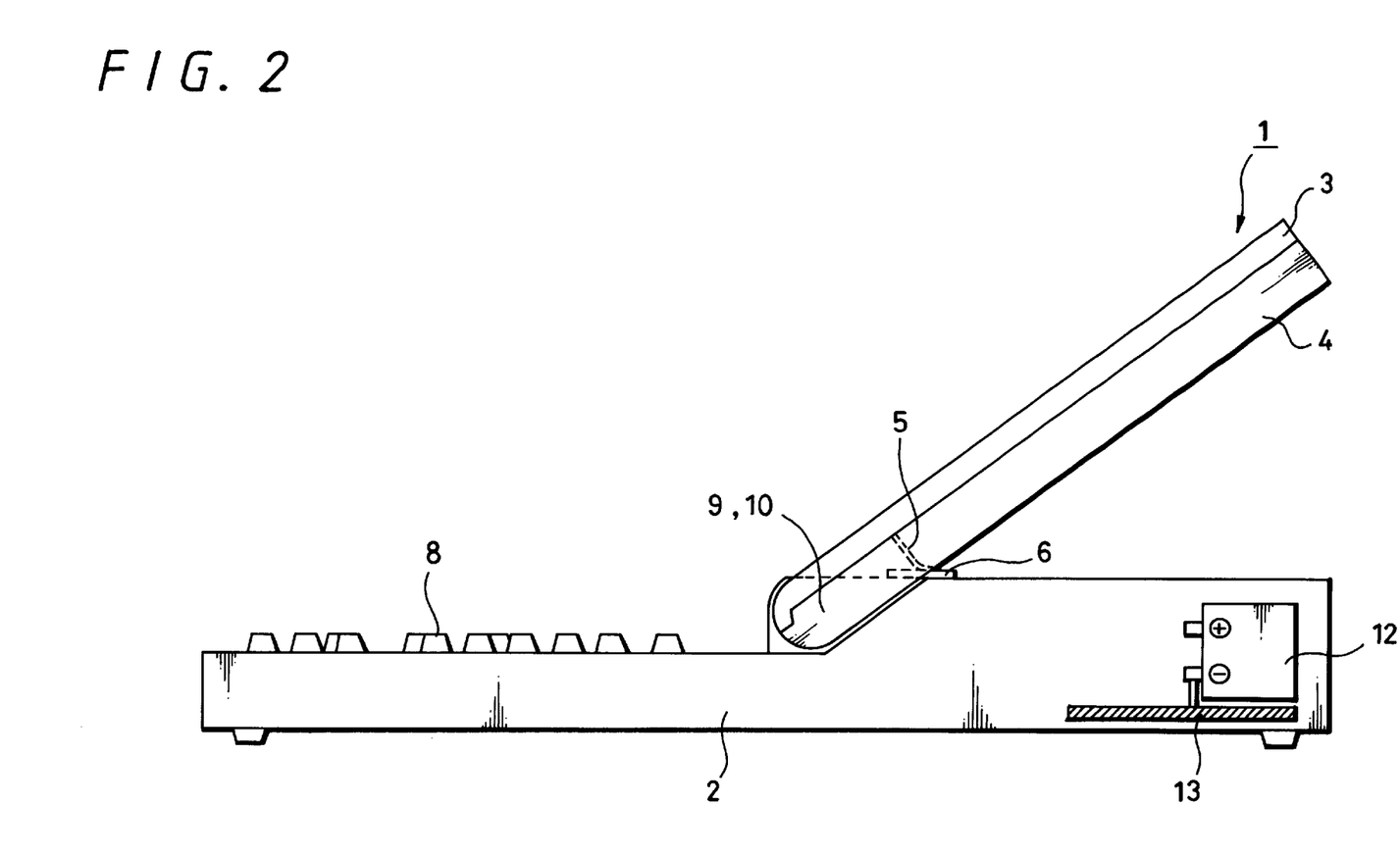
FIG. 2 is a side view showing the relationship between the open/close-type panel and the main body of the laptop type personal computer of FIG. 1.

FIG. 2 shows a schematic view showing a side surface of the laptop type personal computer shown in FIG. 1.

A conductive material 5 is provided between the rotary portions 9 and 10 of the lower panel 4 of the open/close-type panel 1, and a conductive material (cushion 6) is provided at a position of the main body 2 corresponding to the conductive material 5. When the open/close-type panel 1 is opened so as to bump against the main body 2, the conductive material 5 comes in contact with the cushion 6, and the open/close-type panel 1 is supported to the main body 2 so that the supporting state of the open/closed-type panel 1 is maintained.

Incidentally, the conductive material 5 is connected to a conductive surface for preventing an undesired radiation provided inside the lower panel 4 and an upper panel 3, and the cushion 6 is connected with a conductive surface for preventing an undesired radiation provided inside the main body 2. Further, the conductive surface of the main body 2 is connected with a zero electric potential portion (earth line) 13 to be connected with a power source 12 in the main body 2.

According to such an arrangement, in the laptop type personal computer as one example of the present invention, since the conductive material 5 and the cushion 6 are connected with each other face to face, the conductive surface for preventing an undesired radiation inside the open/close-type panel 1 is connected with the zero electric potential portion in the main body 2 by a low impedance. As a result, an electromagnetic noise radiated from the open/close-type panel 1 is reduced.

Next, with reference to FIGS. 2 through 11, the electronic appliance having the open/close-type panel and a method for reducing an electromagnetic noise radiated from the open/close-type panel according to the present invention will be explained in detail.

Figure 3:
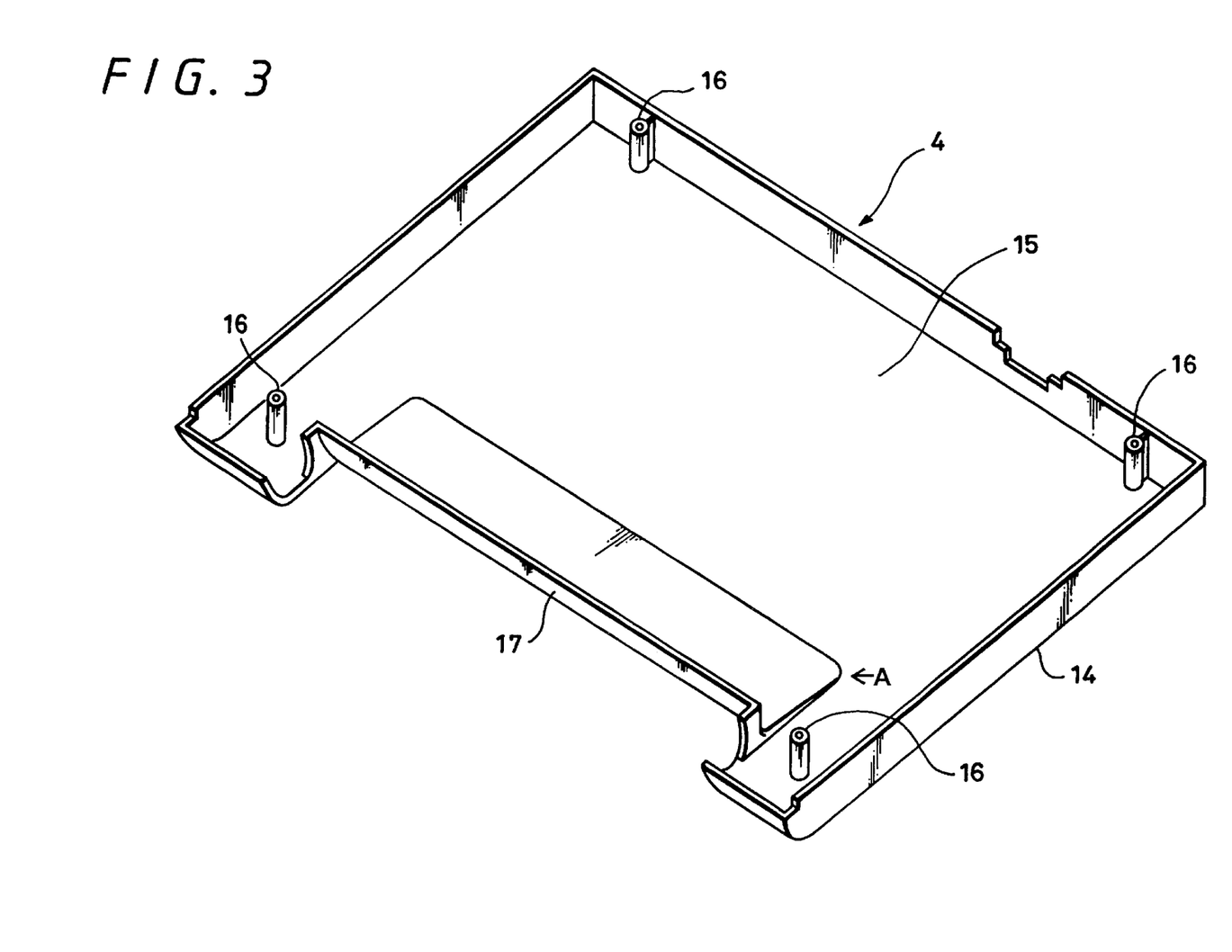
FIG. 3 is a perspective view showing a lower panel of the open/close-type panel.

FIG. 3 shows an outer appearance of the lower panel 4 of the open/close-type panel 1.

As a material of the lower panel 4, a metal material such as magnesium alloy and so on, or a synthetic resin material is used. The shape of the lower panel 4 is the same even if either material is used.

First, the lower panel 4 made of the metal material will be explained.

An ornamental surface (painted surface) 14 is an outside surface of the lower panel 4, that is, a surface which can be seen from an outside and is painted so that its outer appearance is enhanced. Because this ornamental surface (painted surface) 14 is coated with a paint, it has no electrical conductivity.

A rear surface (masked surface) 15 of the ornamental surface 14 is a surface inside the lower panel 4, which cannot be seen from the outside, that is, a surface corresponding to a rear surface of the ornamental surface (painted surface) 14. This rear surface (masked surface) 15 of the ornamental surface does not need an enhancement of its ornamental surface for the outer appearance and is coated with masking when the ornamental surface (painted surface) 14 is painted with a view to generating electrical conductivity so that a coating material does not adhere. In this manner, the rear surface (masked surface) 15 of the ornamental surface has the electric conductivity due to the masking applied at the time of painting in comparison with the ornamental surface (painted surface) 14. This rear surface (masked surface) 15 of the ornamental surface is the conductive surface for preventing an undesired radiation.

A connection-use column 16 fixes the lower panel 4 and the upper panel 3 integrally so as to electrically connect them. Columns which are similar to the connection column 16 are provided at corresponding positions of the upper panel 3, and the columns are fixed by screws.

Here, the electrical connection between the lower panel 4 and the upper panel 3 is secured by not only the connection columns 16 but also an intermesh of stepped portions (not shown) provided on edges of the lower panel 4 and the upper panel 3.

A conductive material fixing portion 17 is a portion on the lower panel 4 side, which corresponds to the contact portion 11 where the open/close-type panel comes in contact with the main body 2 and is positioned between the rotary portions 9 and 10. A conductive material, mentioned later, is fixed on this portion.

The following will describe the lower panel 4 in the case where the synthetic resin material is used to make the same.

The ornamental surface 14 shows a ground surface of the synthetic resin material or is painted, and thus, needless to say, it has no electrical conductivity.

The rear surface 15 of the ornamental surface is wholly coated with a conductive coating material, and it is used as the conductive surface for preventing an undesired radiation. Here, when the rear surface 15 of the ornamental surface is coated with the conductive coating material, the ornamental surface 14 is masked so that the conductive coating material does not adhere to the ornamental surface 14.

The explanation about the other portions of the lower panel 4 in the case where the synthetic resin material is used are the same as the aforementioned case where the metal material is used, so the explanation thereof will be omitted.

An explanation will be given that the conductive material 5 which is connected with the conductive surface for preventing an undesired radiation is provided to the lower panel 4 having the above-mentioned arrangement.

Figure 4:
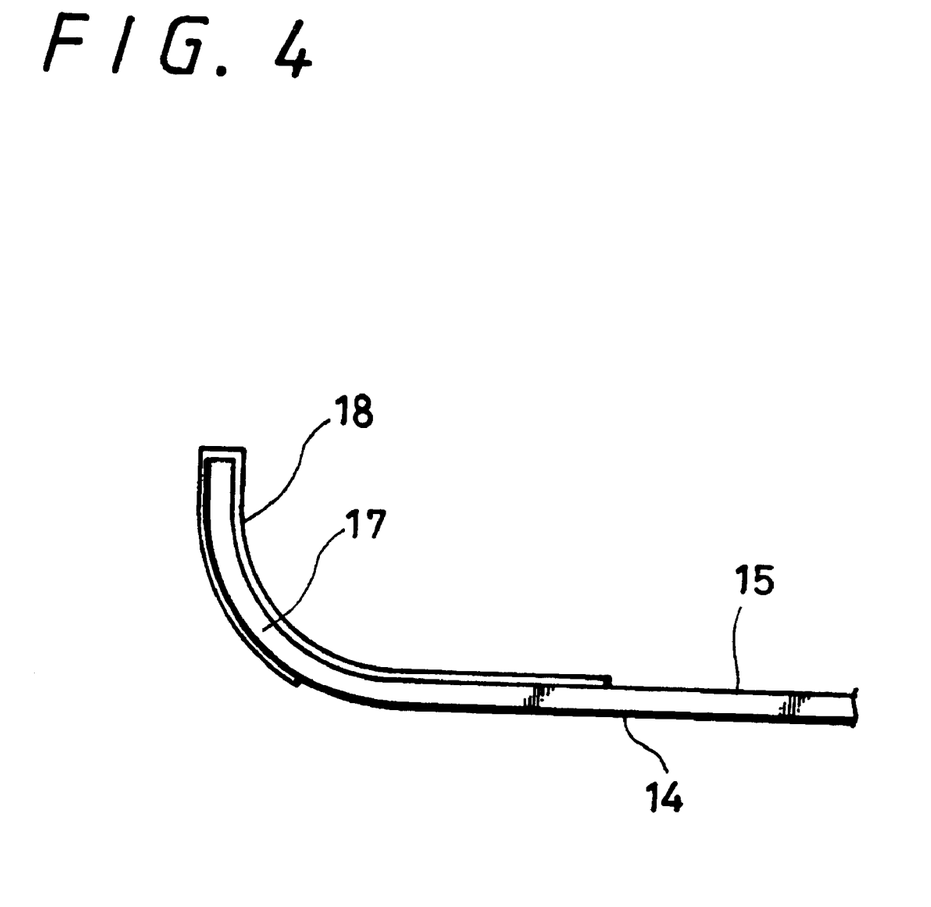
FIG. 4 is a diagram showing a state that a conductive tape as a conductive material which electrically conducts a conductive surface for preventing an undesired radiation is bonded on the lower panel.

FIG. 4 is a cross-sectional view showing the conductive material fixing portion 17 of the lower panel 4 viewed from a direction A shown in FIG. 3.

Here, FIG. 4 shows the case where the metal material is used for the lower panel 4, and the case where a conductive tape 18, which functions also as a connection member for electrically connecting the conductive material 5 with the conductive surface, is used as the conductive material 5.

The conductive tape 18 is bonded on the ornamental surface (painted surface) 14 through the rear surface (masked surface) 15 of the ornamental surface including an end surface of the lower panel 4, and a common tape having conductivity (for example, trade name: CHOÅEFOIL manufactured by Taiyo Metal Net Co. Ltd) can be used.

This conductive tape 18 has organic materials such as plastic and the like as its base material, and conductivity is given to the tape itself by blending the base material with a conductive substance and the like.

Also, as is known from FIG. 4, because the conductive tape 18 is bonded by being folded at the end surface of the lower panel 4, it is required to have flexibility. Here, since this conductive tape 18 is made of the organic materials such as plastic and the like, it has flexibility against a bend and even when it is bent at an acute angle, the conductive tape 18 itself never breaks and becomes fatigued.

A surface on one side of the conductive tape 18 (in FIG. 4, a surface of the conductive tape 18, which comes in contact with the ornamental surface (painted surface) 14 and the rear surface (masked surface) 15 of the ornamental surface), is a bonding surface and an adhesive is coated on this bonding surface.

This adhesive has conductivity. That is, a conductive adhesive is coated on the bonding surface of the conductive tape 18. Therefore, when the conductive tape 18 is bonded on a body having conductivity, the body and the base material of the conductive tape 18 are electrically connected through the conductive adhesive.

A surface (in FIG. 4, a surface of the conductive tape 18 not in contact with the lower panel 4) on the other side of the conductive tape 18 is be brought into conduction with the bonding surface because, as mentioned above, the base material itself of the conductive tape 18 has the conductivity. Therefore, in the conductive tape 18, the surface on a bonding surface side and the surface on an opposite side of the bonding surface have the conductivity spanning both surfaces thereof.

As will be appreciated from FIG. 4, the conductive tape 18 is bonded on the lower panel 4 from the inside to the outside thereof. In other words, the conductive tape 18 is bonded on the lower panel 4 from the rear surface (masked surface) 15 of the ornamental surface to the ornamental surface (painted surface) 14.

To be more specific, in the rear surface (masked surface) 15 of the ornamental surface, the conductive tape 18 is bonded on the surface (conductive surface) which is applied with masking and is conductive. Meanwhile, in the ornamental surface (painted surface) 14, the conductive tape 18 is bonded within a range of being able to sufficiently cover a lower part of the ornamental surface (painted surface) 14, that is, a portion of the ornamental surface (painted surface) 14, which is in contact with the main body 2.

In such a manner, the conductive tape 18 is bonded on the rear surface (masked surface) 15 of the ornamental surface of the lower panel 4, and the conductive tape 18 is folded at the end of the lower panel 4 so as to be bonded also on the conductive material fixing portion 17. By such a simple work, the conductive material 5 which conducts the conductive surface for preventing an undesired radiation of the open/close-type panel 1 is easily formed on a portion (conductive material fixing portion 17) where the open/close-type panel 1 comes in contact with the main body 2.

Here, masking is also applied on a rear surface side of the upper panel 3 of the open/close-type panel 1 at the time of coating so that a conductive surface is formed thereon, and as mentioned above, both the conductive surfaces on rear surface sides of the ornamental surfaces of the upper panel 3 and the lower panel 4 come in contact with each other, that is, the conductive surface of the upper panel 3 has conductivity with the conductive surface of the lower panel 4. As a result, the conductive surface which was formed so as to cover the whole part of the open/close-type panel 1 is connected with the conductive material 5.

Here, by using a conductive material such as the conductive tape 18 having the flexibility against a bend which also has a function to connect the conductive material 5 and the conductive surface, even when the shape of the lower panel 4 has an complex curved surface and the conductive material has to be bent at the end surface of the lower panel 4, the conductive material can be bonded along the shape of the surface of the lower panel 4 without mechanically destroying the conductive material and subjecting it to fatigue. Therefore, this conductive material can firmly be fixed to the lower panel 4.

Incidentally, even in the lower panel 4 made of the synthetic resin material, the conductive tape 18 which is the same as the example of FIG. 4 can be used as the conductive material 5. In this case, even when the materials of the lower panel 4 are different, the conductive material 5 which conducts the conductive surface for an undesired radiation of the open/close-type panel 1 can be easily formed on the portion (conductive material fixing portion 17) where the open/close-type panel 1 comes in contact with the main body 2 by the simple work in the completely same manner as the example of FIG. 4.

Figure 5:
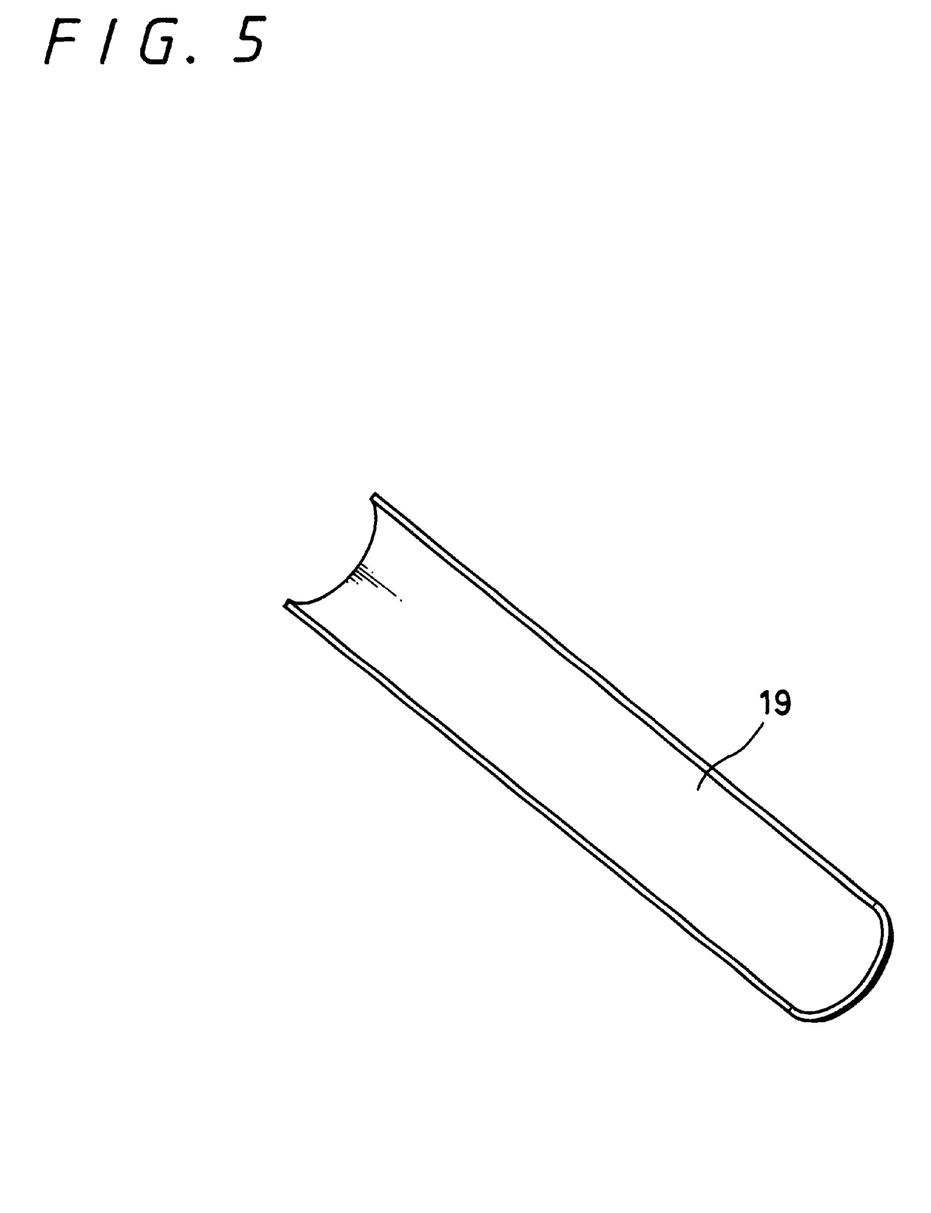
FIG. 5 is a diagram showing a metal plate which substitutes for the conductive tape bonded on the lower panel.

In addition to the conductive tape 18, a metal plate 19 such as an aluminum plate shown in FIG. 5 can be used as the conductive material 5 to be formed on the open/close-type panel 1.

A cross section of the metal plate 19 has an arc shape to be along the curved surface of the conductive material fixing portion 17 of the lower panel 4.

Figure 6:
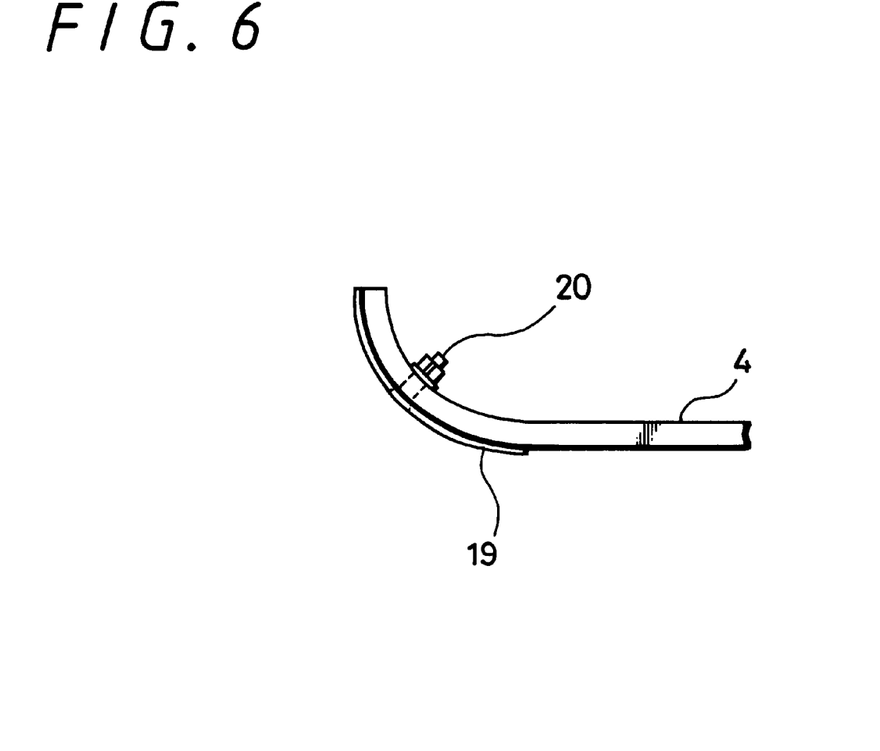
FIGS. 6 and 7 are diagrams showing a state that the metal plate is fixed to the lower panel.
Figure 7:
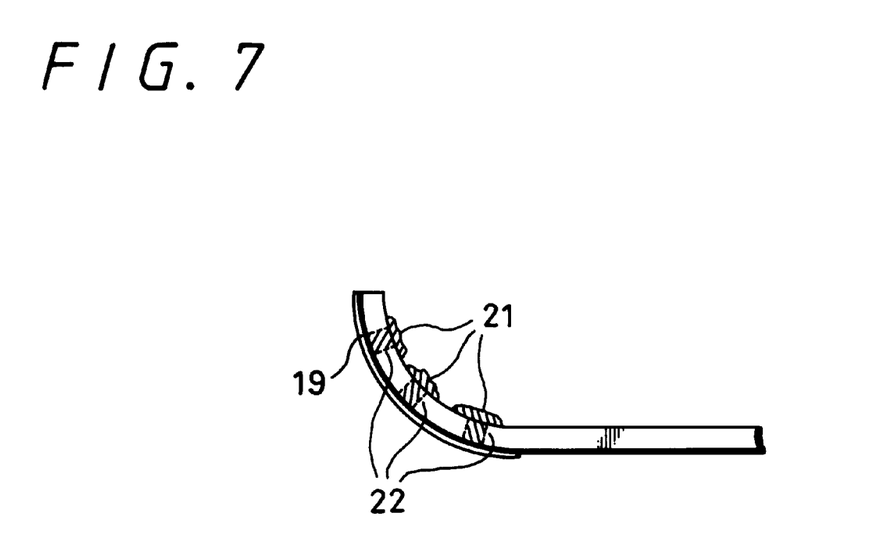

FIGS. 6 and 7 show a method of mounting the metal plate 19 to the lower panel 4.

In FIG. 6, the metal plate 19 is fixed to the lower panel 4 by using plural metal screws 20. The conductive surface for preventing an undesired radiation of the lower panel 4 is connected with the conductive material 5 (metal plate 19) via the metal screws 20.

In FIG. 7, the metal plate 19 is fixed to the lower panel 4 by using a conductive adhesive 21. Plural apertures 22 are provided in the contact portion 11 of the lower panel 4. The conductive adhesive 21 is coated on the metal plate 19 through the apertures 22 from the conductive surface side of the lower panel 4. As a result, the conductive surface for preventing an undesired radiation of the lower panel 4 is connected with the conductive material 5 (metal plate 19) via the conductive adhesive 21.

The following will explain a method of mounting the cushion 6 as the conductive material on the main body 2 side which comes in contact with the conductive material 5 of the open/close-type panel 1.

Figure 8:
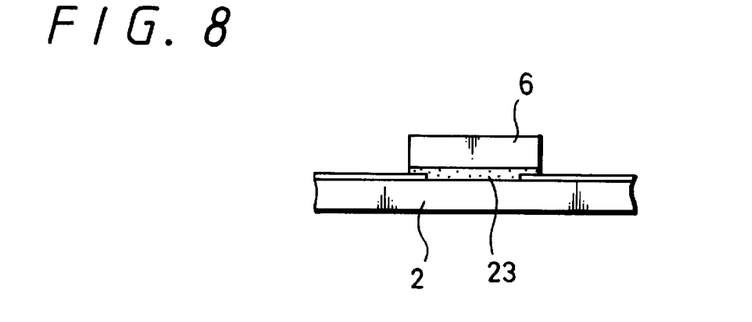
FIGS. 8, 9 and 10 are diagrams showing a state that a cushion as a conductive material which electrically conducts the conductive surface for preventing an undesired radiation in the main body is fixed to a position in contact with the open/close-type panel of the laptop type personal computer made of a metal material.

FIG. 8 shows the state that the cushion 6 is fixed to the main body 2 made of a metal material.

In FIG. 8, a side of the main body 2 to which the cushion 6 (mentioned later) is fixed is a coated surface, and masking is applied thereon at a time of painting. That is, a metal material is exposed from a surface of the main body 2 on which the cushion 6 is bonded and this surface has conductivity.

In FIG. 8, the cushion 6 (conductive material) is made of an organic material such as rubber or the like, and the organic material is blended with a conductive substance such as carbon and the like.

Therefore, a basic material itself of the cushion 6 has the conductivity.

One surface of the cushion 6, that is, a surface on the side which is in contact with the main body 2 is coated with a conductive adhesive 23. As a result, the cushion 6 conducts with the conductive surface for preventing an undesired radiation of the main body 2.

Figure 9:
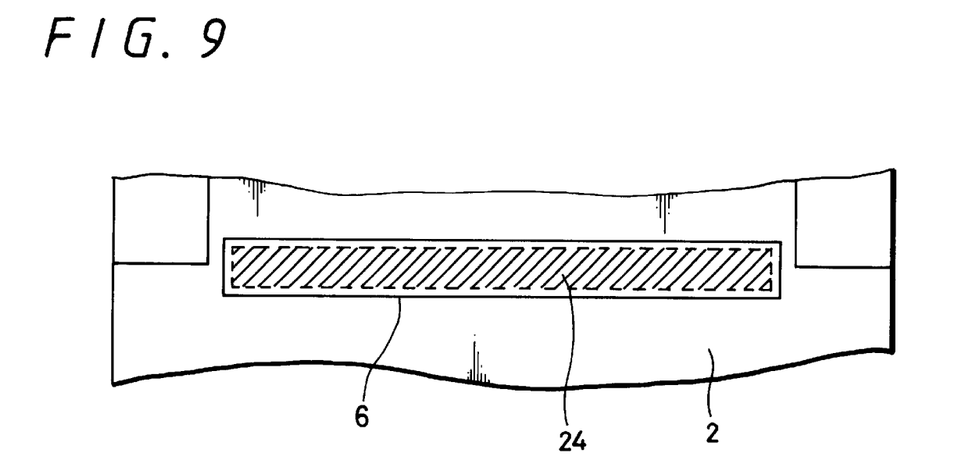

FIG. 9 shows the state that the cushion 6 is fixed to a masked portion (metal material exposed portion formed by applying the masking thereto at the time of painting) 24 of the main body 2.

When the cushion 6 is fixed to the main body 2, an outer periphery of the masked portion 24 comes to a more inner side than an outer periphery of the cushion 6 so that the metal material of the masked portion 24 is not seen directly.

Figure 10:
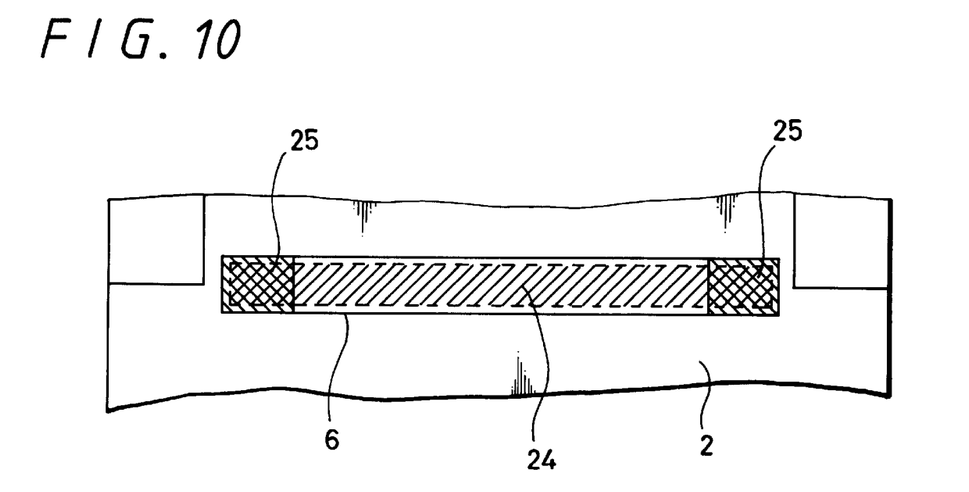

Incidentally, there exists a method shown in FIG. 10 as another method of fixing the cushion 6 to the masked portion 24 of the main body.

In FIG. 10, both ends of the cushion 6 are fixed to the masked portion 24 by a non-conductive adhesive 25, and a center portion of the cushion material 6 is directly in contact with the metal material of the masked portion 24.

In this case, the open/close-type panel 1 comes in contact with the main body 2, and a portion of the cushion 6 other than both the ends of the cushion 6 is pressed against the exposed metal portion of the masked portion 24, thereby obtaining the firm connection.

Figure 11:
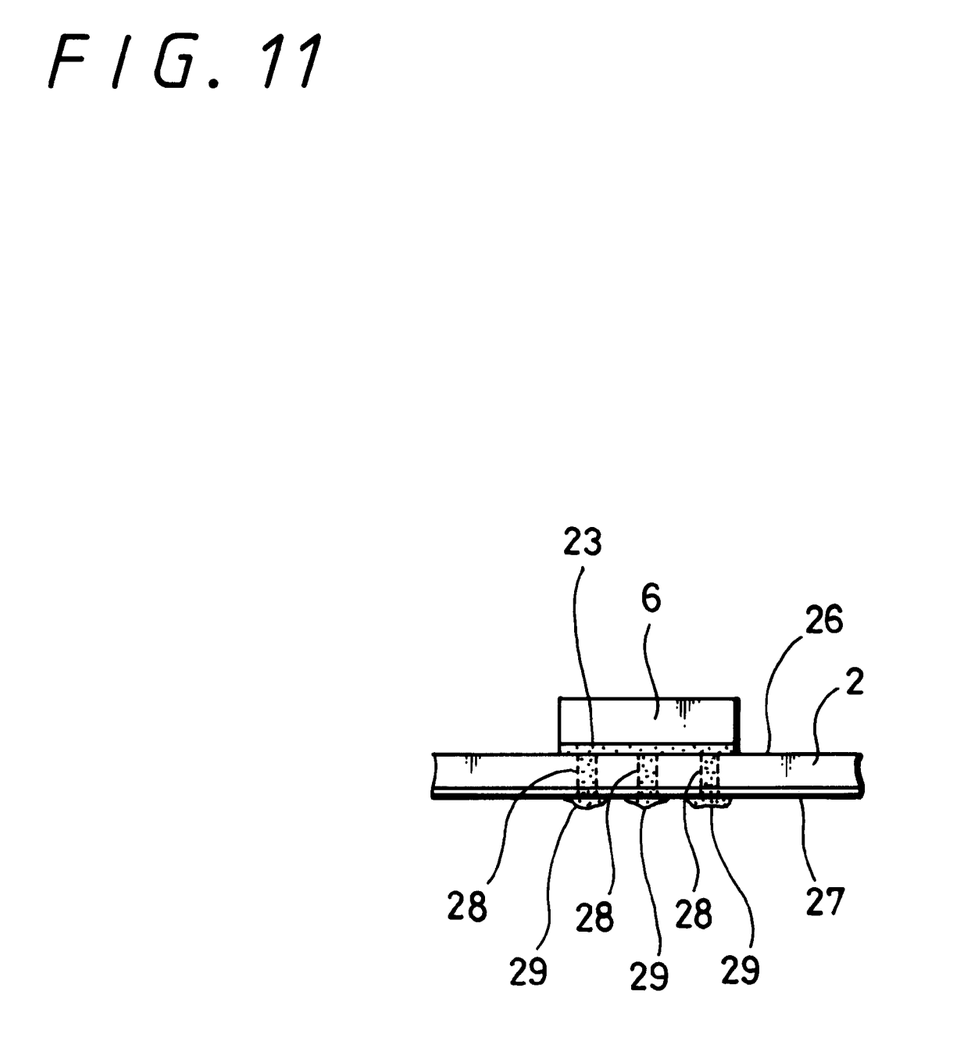
FIG. 11 is a diagram showing a state that the cushion is fixed to a position in contact with the open/close-type panel of the main body of the laptop type personal computer made of a synthetic resin material.

Here, the above refers to the case where the main body 2 is made of a metal material, but in the case where the main body 2 is made of a synthetic resin material similarly to the above-mentioned upper panel 3 and lower panel 4 of the open/close-type panel 1, the cushion 6 is fixed to the main body 2 in the following manner.

FIG. 11 shows the state that the cushion 6 is fixed to the main body 2 made of the synthetic resin material.

An ornamental surface 26 of the main body 2 exposes the ground itself of the synthetic resin material or is coated with painting, and thus, needless to say, has no electrical conductivity.

A rear surface 27 of the ornamental surface is coated with a conductive compound on its whole surface, and this becomes the conductive surface for preventing an undesired radiation.

The cushion 6 is bonded on the ornamental surface 26 of the main body 2 through the conductive adhesive 23. Plural apertures 28 are provided on a whole surface of a portion of the main body 2 on which the cushion 6 is bonded. A conductive adhesive 29 is charged into the apertures 28 from the rear surface 27 side of the ornamental surface of the main body 2. As a result, the cushion 6 conducts the conductive surface for preventing an undesired radiation of the main body 2.

Incidentally, the cushion 6 has not only the conductivity but also plays, at a time of the open/close-type panel 1 being opened until it comes in contact with the main body 2, a role as a shock absorbing material least that the lower panel 4 bumps hard against the main body 2 thereby damaging the surface of the lower panel 4 or the main body 2. That is, the cushion 6 has the role as a pad (stopper) for the open/close-type panel 1. Therefore, it becomes necessary for the cushion 6 (conductive material) to have elasticity.

Here, the conductive material bonded on the main body 2 is not limited to the cushion 6, but other materials can naturally be used so long as they have the conductivity and the elasticity.

Here, by using a material having the conductivity, the portion of the main body 2, on which masking is applied, and the portion thereof which comes in contact with the lower panel 4 are conductive.

Also, by using a material having the elasticity, when the open/close-type panel 1 is opened until it comes in contact with the main body 2 while being in use, even if a strong force is exerted to have the open/close-type panel 1 collide with the main body 2, the open/close-type panel 1 and the main body 2 can be prevented from being damaged as well as the conductive material or tape 5 bonded on the lower panel 4 can be prevented from being damaged.

Also, by using a material having the elasticity as the conductive material, when the conductive tape 5 bonded on the lower panel 4 and the conductive material on the main body side come in contact with each other, because there occurs a deformation in the conductive material on the main body side due to its elasticity, thereby giving birth to a recess along the shape of the lower panel 4, a contacting area of the conductive material on the main body side and the conductive tape 5 of the lower panel 4 can be made larger than a case in which the conductive material on the main body side does not have the elasticity.

The arrangements on the open/close-type panel 1 side and on the main body 2 side are as mentioned above. Therefore, when the open/close-panel 1 is opened to come in contact with the main body 2, an electric connection as will be mentioned in the following is completed.

That is, the upper panel 3 and the lower panel 4 are brought into conduction through the conductive surfaces provided respectively thereon, and of the rear surface (conductive surface) 15 of the ornamental surface of the lower panel 4 and the portion of the ornamental surface (painted surface) 14 of the lower panel 4, a portion which is in contact with the main body 2 is brought into conduction thereto through the conductive material 5, and the conductive material 5 and the cushion 6 are brought into conduction, and further this cushion 6 is brought into conduction with the conductive surface of the main body 2 and the conductive surface is brought into conduction with the zero electric potential portion 13.

Further, as for this conductivity, because the conductive surface of the upper panel 3 and the conductive surface of the lower panel 4 are in contact with each other face to face; the conductive surface 15 of the lower panel 4 and the conductive material 5 are bonded face to face; the conductive cross-sectional area of the conductive material 5 can be secured large since the width of the conductive material 5 can be secured wide; the conductive material 5 and the cushion 6 are in contact with each other face to face, and further selection of a material having appropriate elasticity for the cushion 6 makes it possible to further enlarge a contacting area due to a recess being formed in the cushion 6; since the width of the cushion 6 can be widened and also, its thickness is thin to present small resistance, it is possible to obtain a sufficient conductivity; and because sufficient conductivity can be secured as the cushion 6 and the conductive surface of the main body 2 can be bonded face to face, the open/close-type panel 1 and the main body 2 are brought into conduction while securing a wide conductive area.

From what has been described above, in a portable video tape recorder (portable VTR), a laptop-type personal computer, and the other electronic appliances, by opening the open/close-type panel until it comes in contact with the main body at a time of being in use, the conductive material provided on the open/close-type panel and the conductive material provided on the main body can be brought into contact with each other face to face.

As a result, because the electromagnetic noise which is generated in the open/close-type panel is connected with the zero electric potential portion (earth line) of the main body 2 through a wide surface, the electromagnetic noise radiated outside from the open/close-type panel can be reduced by a large margin so that an effective measure can be employed against the undesired radiation from the open/close-type panel.

Meanwhile, the present invention is not limited to the above-mentioned embodiment, and other various kinds of compositions can be employed without departing from the gist of the present invention.

The present invention provides an effect to be explained in the following.

Since the open/close-type panel has the conductive material which electrically conducts the portion being in contact with the main body and the conductive surface for preventing an undesired radiation, the main body has the conductive material having elasticity which electrically conducts the portion being in contact with the open/close-type panel and the zero electric potential portion (earth line), and by opening the open/close-type panel until it comes in contact with the main body at a time of being in use, the conductive material provided in the open/close-type panel and the conductive material provided in the main body are brought into contact with each other face to face by an elastic deformation, the electromagnetic noise which occurs in the open/close-type panel is grounded to the main body through a wide surface so that electromagnetic noise radiated outside from the open/close-type panel can be reduced by a large margin.

Also, because the conductive material provided on the open/close-type panel has the elasticity against a bend, even when the conductive material has to be bent, it never happens that the conductive material is mechanically destroyed and fatigued. Also, because the conductive material provided on the main body has the elasticity, the contacting area between the conductive material o n the main body side and the conductive material of the lower panel can be made larger.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. In a computer having an open/close-type panel cover and a main body, said open/close-type panel cover being supported to the main body so as to be capable of being opened and closed and including a display member for displaying information when the display member is exposed, said open/close type panel cover being provided with a first conductive surface for preventing an undesired radiation on a surface side when the display member is exposed, said computer being arranged so that when the open/close-type panel cover is opened, the open/close-type panel cover is brought into contact with the main body so as to be latched therewith, said computer comprising:

a first conductive material section provided on a portion of the open/close type panel cover, which comes in contact with a second elastic conductive material section of the main body when the open/close-type panel cover is opened, and said second elastic conductive material section is brought into contact with said first conductive material section in a face to face relationship due to elastic deformation thereof so that the first conductive material section of the open/close type panel cover is brought into a conductive relationship with a zero electric potential portion of the main body, said second elastic conductive material section being bonded to said main body so as to conform with the shape of a surface of the main body to which it is bonded.

2. The computer having an open/close-type panel cover and a main body according to claim 1, wherein:

the open/close type panel cover includes an upper panel, which surrounds the display member so that the display member is exposed and is provided with a second conductive surface, and a lower panel which covers a rear surface of the display member opposite to the upper panel and is provided with said first conductive surface for preventing an undesired radiation, said first conductive surface of said lower panel being electrically conductive with said second conductive surface of said upper panel; and said first conductive material section is made of a conductive tape having elasticity, and the conductive tape is bonded to the first conductive surface of the lower panel to the first conductive material section and comes in contact with the main body when the open/close-type panel cover is opened, through a conductive adhesive.

3. The computer having an open/close-type panel and a main body according to claim 1, wherein:

the open/close type panel cover includes an upper panel, which surrounds the display member so that the display member is exposed and is provided with a second conductive surface, and a lower panel which covers a rear surface of the display member opposite to the upper panel and is provided with said first conductive surface for preventing an undesired radiation;

the second conductive surface of the upper panel and the first conductive surface of the lower panel are electrically conductive with each other; and said first conductive material section is in the form of a metal plate which is electrically connected with the first conductive surface of the lower panel through a connecting member.

4. The computer having an open/close-type panel cover and a main body according to claim 3, wherein said metal plate surface is connected to the first conductive surface of the lower panel by a plurality of screw members.

5. The computer having an open/close-type panel cover and a main body according to claim 3, wherein:

a plurality of apertures are formed in a portion of the lower panel where said first conductive material section is provided; and said first conductive material section is connected with the first conductive surface of the lower panel by a conductive adhesive through the plurality of apertures.

6. The computer having an open/close-type panel cover and a main body according to claim 1, wherein:

the main body is made of a metal having a second conductive surface for preventing undesired radiation; and said second elastic conductive material section of said main body is connected with the second conductive surface of the main body through a conductive adhesive.

7. The computer having an open/close-type panel cover and a main body according to claim 1, wherein:

the main body is made of a metal having the second conductive surface for preventing undesired radiation; and said second elastic conductive material section is partially fixed to the main body through a non-conductive adhesive, and when the open/close-type panel cover comes in contact with the main body, said second elastic conductive material section is pressed against the second conductive surface of the main body so as to be electrically conductive therewith.

8. The computer having an open/close-type panel cover and a main body according to claim 1, wherein:

the main body is made of a synthetic resin member provided with a second conductive surface for preventing undesired radiation inside the synthetic resin member;

a plurality of apertures are formed in a portion of the main body where said second conductive material section is provided; and said second elastic conductive material section is connected with the second conductive surface of the main body by a conductive adhesive through the plurality of apertures of the main body.

9. The computer according to claim 1, wherein a conductive contact area between said first conductive material section and said second elastic conductive material section establishing said conductive relationship with said elastic deformation is larger than a conductive contact area established when said second elastic conductive material section is not subject to said elastic deformation.

10. The computer according to claim 1, wherein said first conductive material section and said second conductive material section have a shape which extends along a contact portion between said open/close type panel cover and said main body when said open/close type panel cover and said main body are brought in contact with each other.

11. The computer according to claim 1, wherein said second elastic conductive material section has a shock absorbing function when said open/close type panel cover comes in contact with said main body.

12. In a method of reducing electromagnetic noise from a computer formed of an open/close type panel cover and a main body, the open/close-panel cover being supported to the main body so as to be capable of being opened and closed and including a display member for displaying information and an upper panel surrounding the display member so that the display member is exposed, said open/close type panel cover being provided with a first conductive surface for preventing undesired radiation, said computer being arranged so that when the open/close-type panel cover is opened, the open/close-type panel cover is brought into contact with the main body so as to be latched therewith, said method comprising the steps of:

opening the open/close-type panel cover until it comes in contact with the main body; and bringing a first conductive material section, provided on the open/close type panel cover to a conductive relationship with the first conductive surface of a lower panel of the open/close type panel cover, and a second elastic conductive material section, which is bonded to main body so as to conform with the shape of a surface of the main body to which it is bonded and is brought to a conductive relationship with a second conductive surface of the main body connected with a zero electric potential portion of the main body, said first and second conductive sections being brought in contact with each other by an elastic deformation of said second conductive section when said open/close type panel cover is brought into contact with the main body.

13. The method according to claim 12, wherein said electric deformation results in a conductive contact area that is larger than a conductive contact area established when said second elastic conductive material section is not subject to said elastic deformation.

14. The method according to claim 12, wherein said first conductive material section and said second elastic conductive material section have a shape which extends along a contact portion between said open/close type panel cover and said main body when said open/close type panel cover and said main body are brought in contact with each other.

15. The method according to claim 12, wherein said second elastic conductive material section has a shock absorbing function when said open/close type panel cover comes in contact with said main body.

\* \* \* \* \*